June 10, 1930.　　　H. W. O'NEILL　　　1,762,791
CHRONOGRAPHIC SYSTEM
Filed Sept. 26. 1918　　　4 Sheets-Sheet 1

Inventor:
H. W. O'Neill

June 10, 1930.   H. W. O'NEILL   1,762,791
CHRONOGRAPHIC SYSTEM
Filed Sept. 26. 1918   4 Sheets-Sheet 3

Inventor:
H. W. O'Neill

Patented June 10, 1930

1,762,791

UNITED STATES PATENT OFFICE

HENRY W. O'NEILL, OF ELMHURST, NEW YORK

CHRONOGRAPHIC SYSTEM

Application filed September 26, 1918. Serial No. 255,824.

This invention relates to chronographs, and more particularly to apparatus and system for indicating intervals of time in the practice of the mechanic arts based on the science of ballistics.

The principal object of this invention is to provide a method and improved apparatus and system for reliably and efficiently securing greater accuracy or exactness in the production of records which may graphically represent the moment or duration of an event or the length or intervals of time which may transpire between two or more events.

In connection with the art of gunnery or ordnance, the manufacture of fuses for projectiles requires close observance of laws as demonstrated by induction, experiment or observation under the science of ballistics, and in order that reliable and authoritative information may be obtained relative to whether completely manufactured fuses may be properly judged with respect to the possible accuracy of their performance, relative to predetermined permissible variation or tolerances, under the exacting requirements of "field" service, for which they may be intended, it is necessary that numerous tests based principally on the element of time, should be carefully carried out. Timing tests are also necessary in connection with the speed or flight of shells, and particularly in connection with projectiles equipped with time fuses. Such timing information serves as a modulus or for verifying the graduations of the time-train rings of the fuses, since the time characteristics of a fuse must necessarily conform to the time or velocity characteristics of the shell.

Referring briefly to tests which it is necessary to make in order that the manufacture of projectile fuses particularly of the time-fuse type, may be carried out in a reliable and efficient manner, it is the usual practice to select a predetermined number of certain component fuse parts from a general quantity of parts in process of manufacture or assembly and to subject such selected parts to tests whereby records may be produced indicating the time factor or time element relative to the performance of the tested parts. On completion of the assembling operations on what is usually termed an entire "lot" of fuses a predetermined number of fuses selected at random from the lot are subjected to so-called static, standing or burning tests. In case the time-element record of such tests indicates that the fuses of the lot may be expected to perform within predetermined permissible time variation or tolerances a further number of fuses selected at random from the lot are tested under actual service conditions as may be carried out or fulfilled on the firing range of a polygon or proving ground. The first mentioned tests are usually referred to as "factory" tests while the last mentioned tests are termed "polygon" or "firing" tests.

The performance of time fuses as commonly employed with shrapnel shells, must be uniform, one fuse compared with another, and it is therefore necessary to restrict the permissible range limits of time variation to very close margins or tolerances. Although time fuses are sometimes manufactured under specifications permitting a considerable variation in the operating or burning time of the fuses, such liberal limits have generally been necessary in order that fuses may be obtained. In order to be properly effective, however, it is well understood that time fuses should perform within the smallest possible range limits, and in this connectioin, it may be mentioned that tolerances frequently specified, but seldom met, refer to a total plus and minus range limit of thirteen one-hundredths of a second as the maximum variation for the burning time of a twenty-one second fuse.

In view of the necessity for securing time fuses capable of performing within close range limits of variation, it will be obvious that in case a chronographic or other timing system employed either at a factory or a polygon should possess any inherent characteristics likely to result in non-uniform or variableness in performance, or if the factor of accuracy of the chronograph should be other than relatively 100 per cent exact, such variations or inexactness either preclude the possibility of proper fuses being manufactured or cause the rejection of entire fuse lots.

thereby entailing loss and unnecessary delay in the furnishing of fuses.

It is, of course, well understood in the mechanic arts that movement of a physical body requires an interval of time depending on the inertia, friction, and force which may be acting, and although many forms of electromagnets are capable of extremely rapid movement such devices are usually not adaptable to the chronographic work under discussion, and it is not infrequently the case that electromagnetic devices suitable in other respects possess a factor of error or a time factor of operation greater than the variation or tolerances properly permissible in the timing tests of time fuses as they should be manufactured.

In carrying out the present invention there is provided improved apparatus and suitable coordination thereof to employ the instantaneous action of fulminates, explosives, and the fusing or vaporizing of matter by means of an electric current in such a manner that the production of graphic time records may be carried out with reliability and such exactness that the time factor of operation of the chronographic devices may be considered as nil, or so low that these factors may be neglected as not sufficient to affect the results in the most exacting timing operations.

This invention is illustrated in the accompanying drawing, and for the sake of clearness, only so much of a time recording or chronographic system has been shown as will be necessary to a ready and clear understanding of the method and features of the system.

Referring to the drawing, In Fig. 4 is similarly shown the detail of a fuse-clamping or fuse-holding fixture which forms a part of the equipment shown in Fig. 3, while Fig. 6 is, in general, a top perspective view of a chronographic equipment suitable for illustrating the recording of intervals of time in connection with the testing of fuses as may be controlled by the equipment shown in Fig. 3, while Fig. 7 is a combined perspective and diagrammatic view illustrating an alternate method for producing markings on a chronographic record, and also serves to illustrate an assembly suitable for simultaneously testing a plurality of fuses, while in Fig. 8 is shown in side section the detail of fulminating record-marking detonators or caps as assembled to form a part of the equipment shown in Fig. 7. Fig. 10 similarly shows an alternate arrangement for controlling a pen or record-marking device, and Fig. 11 similarly illustrates an alternate arrangement for indicating the initiation of a fuse-burning test, while Fig. 12 illustrates in vertical section a fulminating primer which forms a part of the equipment shown in Fig. 11. Fig. 13 is a partially sectional and partially diagrammatic view illustrating an alternate method for indicating the termination of a fuse testing operation, and Fig. 14 similarly shows an alternate method for igniting a fuse, and also applies this arrangement to the simultaneous ignition of a plurality of fuses. In Fig. 15 is illustrated in diagram an adaptation of the arrangement shown in Fig. 14, whereby a record marking device may be controlled from a circuit employed simultaneously to ignite a plurality of fuses, while in Fig. 16 is similarly illustrated an alternate arrangement of the circuits shown in Fig. 15. Fig. 17 is a combined perspective and diagrammatic view of an arrangement alternate to that shown in Fig. 6 for marking predetermined intervals of time on a chronographic record, while Figs. 18 and 19 similarly illustrate additional respective arrangements for effecting such time record markings. Fig. 20 is a perspective view of a pen suitable for use in the present system, while an alternate pen arrangement is similarly shown in Fig. 21. In Fig. 22 is similarly shown an alternate arrangement for a circuit controlling portion of the equipment shown in Fig. 13, while

Figure 1:
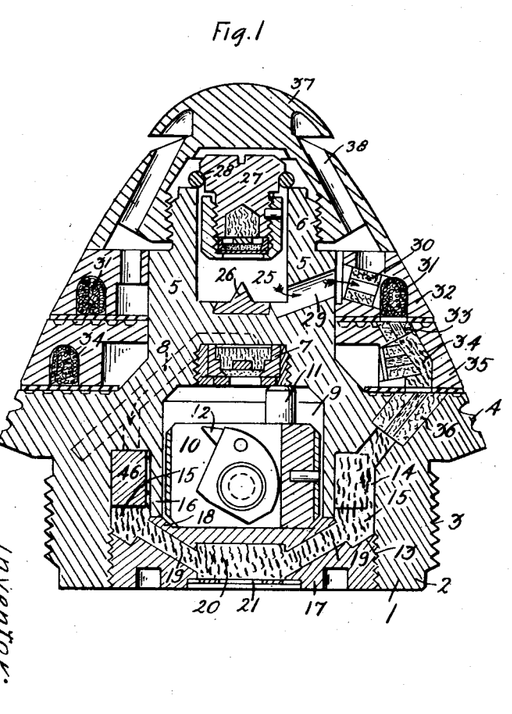
Fig. 1 is a view in vertical section of a time fuse which may be considered as representative of time fuses employed with projectiles.

In describing the operation of this system attention will first be directed to Fig. 1 of the drawing in which the fuse shown is of the so-called combination type, that is, having both concussion and percussion elements. The various parts of the fuse are assembled upon and supported by a fuse body 1, formed with a base portion 2 having a shell engaging thread 3, a ring ledge or shoulder 4, and a stem or neck portion 5 provided with a cap engaging thread 6. Since the percussion elements of the fuse do not require specific consideration in the present description they will only be briefly pointed out as comprising a percussion primer 7, a chamber 9 for a percussion plunger 10 comprising a restraining spring housing 11 and a firing pin 12. A flash duct 8 establishes communication from the primer 7 to the powder of a base charge chamber 14, common to the percussion elements.

In describing the concussion or time element features of the fuse, a bore extending axially downward in the stem 5 forms a concussion chamber 25 at the bottom of which is fixed a firing pin 26. A concussion plunger 27, held suspended in the chamber 25 by means of an open resistance ring 28, responds to inertia at the moment of firing, slips through the ring 28 and is detonated by striking the pin 26, whereupon, flame will be transmitted through a flash duct 29 as indicated by the arrows. This fire encounters a powder pellet 30 which communicates with powder 31 in an annularly formed groove in the face of an upper timetrain ring 32. The powder 31 will burn throughout the groove which extends not quite around the ring 32. A pellet of powder 33 will next be ignited to fire powder 34 contained in an annularly formed groove in the face of a lower or graduated timetrain ring 35. This groove is similar to the powder groove of the ring 32 and while the latter ring is fixed in position with respect to the body of the fuse, the lower ring 35 may be revolved on the stem 5 of the fuse body to include any predetermined length of the powder in the groove of this ring between an end point of the groove at which fire may be received through the pellet 33, and a pellet 36 which extends through the shoulder 4 of the fuse body for the purpose of transmitting fire to base charge powder 15, contained in the chamber 14. It may be mentioned that as shown in the drawing the setting of the fuse is on so-called canister, that is, instead of the time elements being required to act in order to explode the base charge powder the various pellets will conduct the flame of the plunger 27 directly to the base powder. Time tests relative to this transmission of fire for canister or "grape" setting of the fuse will be considered presently. In sealing the base charge chamber 14 a bottom closing-screw 17 may be turned into the threads 13, and an inner wall 16 will be engaged by a raised portion 18 on the inner surface of the closing screw to prevent the powder 15 entering the percussion chamber 9, while a frangible washer 21 suitably crimped into the lower face of the screw 17 serves to seal in the base charge powder 15 which may also occupy ducts 19 and a small compartment 20 present in the closing screw. When the fuse is attached to a shell, explosion of the powder 15 destroys the washer 21 thereby permitting flame to rush downwardly into the shell and cause it to explode.

A cap 37, having a plurality of vent ducts 38 may be secured to the stem 5 of the fuse body by means of the threads 6, and serves to a clamp the time train rings in place and also to enclose and loosely retain the concussion plunger 27 in place.

Figure 2:
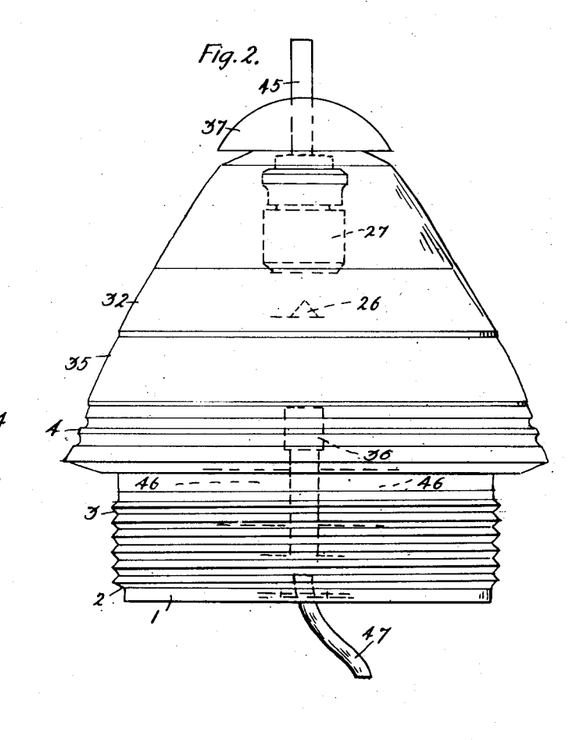
Fig. 2 is a perspective view of the fuse shown in Fig. 1 and illustrates slight modifications of the fuse relative to the incorporation of parts whereby testing operations may be carried out or facilitated.

In order to subject a fuse to a standing test it is usually convenient to provide a cap having a bore extending downwardly through its apex, to permit the insertion of a plunger 45 as shown in Fig. 2. A sharp blow delivered on the upstanding end of the plunger 45 will drive the concussion plunger 27 onto the firing pin 26, thereby igniting the fuse in a manner corresponding with ignition resulting at the moment the fuse may have been fired from a gun, as already described. In connection with standing tests it is usually necessary to reduce the quantity of the powder used as a base charge, in order to avoid the effects of the violent explosion which would result from using a standard or service quantity of this powder. This reduction in powder may be conveniently carried out by providing an open ring 46 of rectangular cross-section which may be sprung into the base charge chamber 14, and so positioned that the open portion or gap-space present between the adjacent ends of the ring will be in alignment with the fire communicating duct of the fuse body which contains the pellet 36. Since the percussion elements are not necessary to a standing test, economy of parts may be observed by eliminating the plunger 10, and in an arrangement which will now be described the bottom closing screw 17 may also be dispensed with, these parts are therefore saved since the heat from a burning test usually renders all parts of a fuse properly rejectable for approved work. Accordingly, after the assembly of a fuse has been completed, except as to the plunger 10 and the closing screw 17, the fuse may be held in an inverted position in order that a small quantity of base charge or detonating powder may be poured into the restricted compartment already described as present between the approaching ends of the spacing ring 46 which may be seen in position in Fig. 1 while its general outline is further shown in Fig. 2. An effective, convenient, and economical method of sealing the powder in place may be described as placing one end of a foil ribbon, tin foil is proven entirely suitable for this purpose, within the exposed opening of this chamber and tamping it in place in such a manner that in addition to retaining the powder the foil will be established in effective electrical contact with the metallic body of the fuse. A few inches of the foil may be left to hang free as indicated by the strip 47 in Fig. 2.

Figure 3:
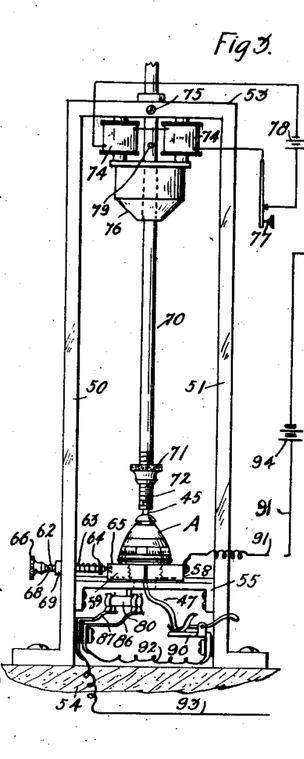
Fig. 3 is a perspective view in side elevation of an equipment suitable for subjecting a fuse to operations necessary in carrying out a test.
Figure 4:
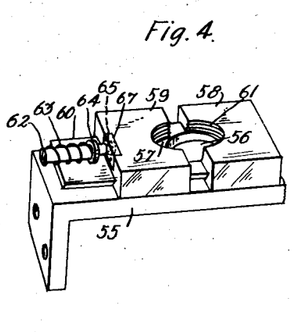

Referring now to features of the present system whereby tests may be made to determine the burning time characteristics of fuses, reference will be had to Fig. 3 of the drawing, wherein a frame comprising uprights 50 and 51 is formed with a head piece or lateral 53 and is supported upon a suitable base 54. An anvil bracket 55 carried by the uprights is provided with an opening 56 (Fig. 4) which suitably registers with a threaded opening 57 jointly formed in two "jaw" or "chucking" blocks 58 and 59. The jaw 58 is fixed to the bracket 55 while the jaw 59 is arranged to be slidably movable along a beveled guide member 60, for the purpose of convenience in clamping a fuse in position, as shown in Fig. 3, suitable for subjecting it to a burning test. This clamping is rendered effective through the meshing of the threads 61 of the jaws with the male threads 3 of the fuse body (Fig. 1). For convenience in operating this fuse chucking fixture a plunger-rod 62 is arranged to work through a bore in the upright 50 and to pass through an helically formed spring 63 the ends of which respectively abut the upright 50 and a nut or shoulder 64 carried by the rod 62, thereby exerting pressure to force the jaw 59 inwardly toward the jaw 58. The inboard end of the rod 62 is so joined to the jaw 59 that on the rod being pulled outward by means of the handle 66 this jaw-block will be drawn away from the jaw-block 58, thereby permitting ready insertion or removal of a fuse at this fixture. A washer 67, or a suitable spring substituted therefor, of resilient material, assembled between the end of the rod 62 and the block 59 provides that additional pressure on the handle 66 may further force the rod forward to permit threads 68 on the shank of the rod 62 to engage mate threads in a boss 69 of the upright 50. The shank of the rod 62 being of greater diameter to permit of this threading, whereby, in situations deemed advisable, the jaw 59 may be forced "home" and held immovable against any shock which may result from the discharge of a heavy base charge as may be required under certain tests.

Assuming now that a fuse, designated by the reference character A, has been provided with the parts 45, 46, and 47 as already described, and placed in position in the chucking-fixture, as shown in Fig. 3, a vertically positioned rod 70 extending through a bore in the head piece 53 is provided with a bore in its lower end suitable for receiving the end of the firing plunger 45. Threads 72 on the rod provide for adjustment in height of an anvil nut 71 on which a weight or ram 76 may strike on being released through deenergization of magnets 74, due to depression of a key 77 to disconnect a source of current 78. The rod 70 in extending through a bore axially aligned in the weight 76 serves as a guide in directing the weight onto the firing plunger 45, in a smooth and relatively frictionless manner. The rod 70 is adapted to slide freely through the bore in the lateral 53, thereby permitting it to be raised in order to facilitate the placing and removal of fuses at the chucking fixture. A "click" plunger 75 suitably mounted in the lateral 53 is adapted to engage a bore 79 in the rod 70 in order to retain the rod in an elevated position. This latching arrangement should be sufficiently rugged to withstand the impact of the ram 76, in case it may be inadvertently released at an improper moment and otherwise cause premature ignition of a fuse.

Figure 5:
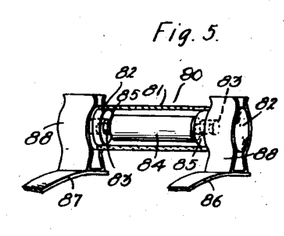
Fig. 5 is a side elevation view in perspective illustrating detail of a "loose"-contact assembly which also forms a part of the equipment shown in Fig. 3.

Referring more particularly to the circuit devices, a loose contact assembly 80 comprises details illustrated in Fig. 5, wherein two metal plugs 82 are respectively inserted in the ends of a tube 81 formed of insulating material, glass being a preferred material, while bores 83 centrally aligned in the inner ends of the plugs 82 respectively receive pins or extensions 85 of a metal cylinder 84. The bores 83 provide looseness of fit with respect to the pins 85 in a manner to retain the cylindric member 84 loosely suspended in establishing electrical contact between the end plugs 82. Spring clips 88 carried by resilient supporting members 86 and 87 are adapted to receive and clamp the plugs 82 in providing an exterior connection by way of the supports 86 and 87, which may be mounted to press the loose contact assembly against a projection extending downwardly from the under surface of the anvil bracket 55, as shown in Fig. 3. This projection is indicated by two vertical lines between the loose contact assembly 80 and the anvil. The strip of tin foil 47, attached to the fuse as already described, after being passed through the opening 56 in the bracket 55 may be inserted between the jaws of a clamping device 90, carried by but insulated from the upright 51. A circuit may now be traced from a conductor 91, common to a battery 94, by way of the block 58, the body of the fuse A, the foil strip 47, the clamp 90, a conductor 92, thence completing circuit through the loose contacts 80, as provided through the conducting supports 86 and 87 which are suitably insulated at their point of support on the upright 50. A conductor 93 extends this circuit through the winding of an electromagnet 109 (Fig. 6) thence to the opposite side of the source of current 94.

Figure 24:
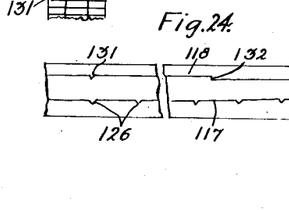
Fig. 24 is a diagram showing the character of the markings produced on a chronographic record by the equipment shown in Figs. 6, 9, and 10.

Before further considering the circuit just traced the equipment shown in Figs. 6 and 6A will be described. Accordingly, a record sheet 100, usually of paper, may be passed from a supply reel 101 over a drum 102 and between feed rollers 103 and 104 suitably geared to be driven by a constant speed motor 108. Two electromagnets 106 and 109 positioned on opposite sides of the record sheet 100 are respectively provided with armatures 107 and 110 which carry pen arms 113 and 114, respectively. A pen 115 attached to the arm 113, positioned to trace a line 117 on the sheet 100, may execute movements transverse with the strip or sheet in response to movement of the armature 107. A second pen 116 carried by the arm 114 may trace a line 118 on the sheet, and respond to movement of the armature 110 in a manner similar to that in which the pen 115 may be controlled by the magnet 106. A suitable chronometer means is illustrated as a clock 120 the pendulum 121 of which may sweep through a globule of mercury 122 contained in a suitable cup 123, provided with an adjusting screw 124 whereby the level of the mercury above the rim of the cup, due to the phenomenon of cohesion, may be regulated. This circuit arrangement provides that the magnet 106 may be momentarily energized by current from a source 125 each time the tip of the pendulum passes through the mercury in its oscillations or excursions. Such energizations of the magnet 106 cause the pen 115 to be momentarily deflected to the right and results in producing the abrupt "jogs" 126 in the line 117. By providing that the pendulum 121 will have the standard length whereby it may close the circuit through the magnet 106 once per second, the offset points or jogs 126 on the strip 100 will, of course, subdivide the line 117 into intervals corresponding with the lapse of one second of time. In describing the functions of the pen 116 it will first be pointed out that current from the source 94 may normally flow through the windings of this magnet 109 by way of the circuits already traced through the equipment of Fig. 3. During such energization of this magnet the pen 116 will accordingly be held to the left, while momentary interruption of the circuit through this magnet will cause corresponding jogs 131 in the line 118. In order to test the fuse A it may now be assumed that the key 77 is depressed to release the weight 76 which will thereupon descend and cause ignition of the fuse, through striking the nut 71 and causing the rod 70 to drive the plunger 45 downward to force the primer 27 onto its firing pin 26. At the instant the weight causes the concussion plunger to strike its firing pin this impact is mechanically transmitted through the fuse A and the bracket 55 to the loose contacts 80 which respond thereto and momentarily open the circuit through the magnet 109, thereby permitting the pen 116 to deflect and produce a jog indication 131 in the line 118 which will correspond with the instant the event represented by the firing of the fuse took place. The loose contact or vibratory device 80 as shown in Fig. 5 is considerably enlarged, a suitable mass for the movable member 84 is found to be approximately 0.5 gram, while the other parts properly proportioned, result in a unit of relatively midget size. In the control of an electrical circuit, transverse vibration of the loose member 84 through its restricted range of travel, has the effect substantially of opening the circuit of the chronograph, normally closed therethrough. As controlled by vibration due to the impact of the firing ram, it will be obvious that response of the mass 84 is due to acceleration and may be based thereon rather than on amplitude. In accordance with the laws of motion, this acceleration device is characterized by extreme sensitiveness, and its factor of distortion or error relative to time of response, is practically zero. In contrast to this, substantially any member having a mass suitable for control by amplitude in contradistinction to acceleration, has or will introduce an appreciable error as to time of response. Therefore, with respect to the vibratory translator 80, the marking device of the chronograph will be acted upon coincident with the vibrations present in firing the fuse. At the instant the burning of the fuse ceases and the explosion of the base charge powder 15 (Fig. 1) takes place the foil strip 47 will thereby be vaporized or blown clear of the fuse A, and accordingly, the circuit of the magnet 109 will be broken due to the elimination of the foil strip 47 and the pen 116 will therefore be released to trace a line offset to the right of the present position of the line 118. Referring to Fig. 24 an example has been assumed and the markings for a burning are shown as a jog 131 to indicate the instant the fuse was ignited, while the point of offset 132 in the line 118 corresponds with the instant the burning of the fuse terminated. By comparing these markings with the time markings 126 in the line 117 the time corresponding with the burning time of the fuse may be obtained.

In further reference to the vibratory contact assembly 80 (Fig. 5), the fact that the member 84 is loosely seated at each end in the bores 83 thereby introducing two distinct sets or points of contact in the circuit through this assembly, it is a phenomenon of this device that under acceleration of the inertia element 84 the opposite pins 85 apparently are never in phase with respect to engagement with the walls of the bores in the opposite contact plugs 82. This is manifested by cessation of current through the device while it may be under vibration. The clearance of the pins 85 relative to the walls of the bores 83 is small, usually only a few one thousandths of an inch. A complete cycle of movement of the inertia member 84 may be described as a first upward movement which may be arrested by the pins 85 striking the upper surfaces of the bores 83, whereupon the member may fall or rebound and be arrested by the pins striking the lower surfaces of the bores. Acceleration again takes place causing the member to bounce upward in starting another cycle of movement or vibration. The anvil 55 (Fig. 3) may be considered as a plate or bar fixed at its edges or ends, as shown, and of such dimensions as to be characterized by a relatively high period as regards its capacity for vibration, while the ram 76 may constitute a means for exciting vibrations in the anvil. Over the physical connection above described, this may result in vibratory response of the element 84 which may continue in motion so long as vibrations may be received from the anvil. Therefore, the circuit of the chronograph may be disconnected at the first instant of response of the member 84, and may continue disconnected until the vibrations may damp out or die down in the anvil and the assembly 80, thereby permitting the element 84 to come to rest and reestablish the circuit. As indicating the extreme sensitiveness of this contact arrangement it has been determined that an energy of 12 microwatts is sufficient for accelerating the member 84 in reliably controlling an electric circuit. Although this element is extremely sensitive to vibrations of relatively high frequency it is substantially unaffected by low frequency vibrations as usually present in buildings in which machinery may be in operation. The speed of response of the element 84 has also been found to be greater than the speed of response of commercial electromagnets even when of special polarized arrangement. In meeting this speed characteristic of the assembly 80 the arrangements of Figs. 7 and 10 may be employed, wherein on the instant of first response of the element 84 in removing a shunt path, current at high potential may fire a detonator or vaporize a fusible circuit link. These operations will be described in detail further on.

Figure 6:
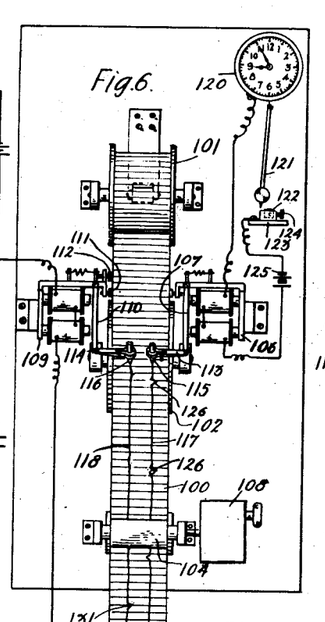
Figures 7, 8:
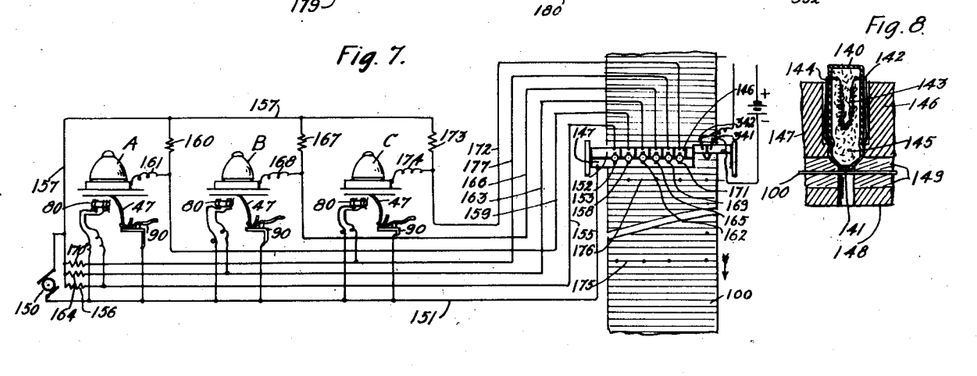
Figures 9, 23:
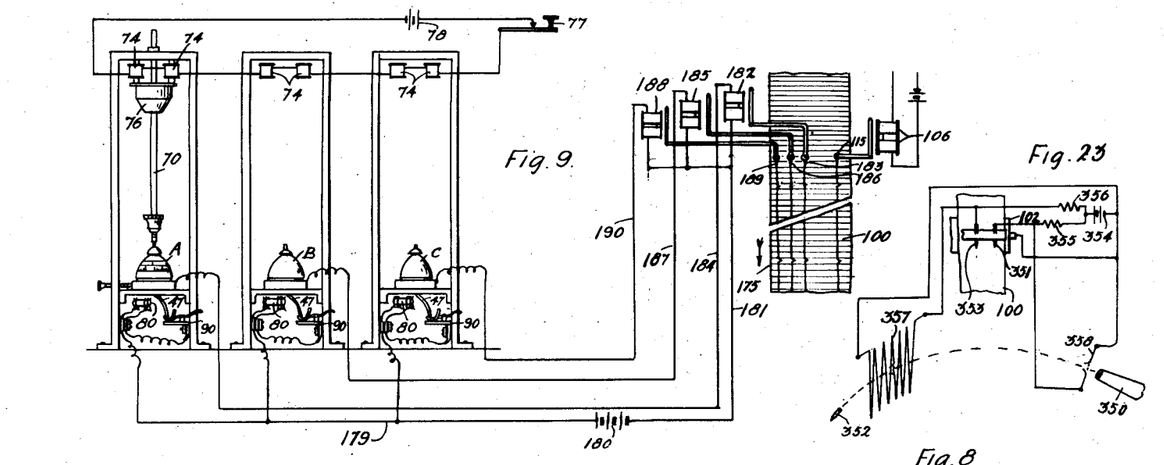
Fig. 9 is a combined perspective and diagrammatic view illustrating an extension of the capacity of the equipment shown in Figs. 3 and 6, whereby a plurality of fuses may be tested simultaneously.
Fig. 23 illustrates in diagram an equipment suitable for use at a proving grounds in obtaining records of the time characteristics of a projectile in flight.

Referring to Fig. 7 of the drawing an alternate arrangement for carrying out timing operations similar to those already described, relates to the employment of a fulminate or explosive to effect the actual markings on the record strip 100. For convenience of description a cap similar to that shown in enlarged form in Fig. 8 has been chosen. This cap or primer comprises a suitable non-metallic shell 140 having a tip opening 141 and provided with oppositely positioned spring members 142 and 144 joined by means of a suitable filament strip 143 around which a wisp of gun-cotton may be placed, while the chamber of the shell may be filled with powder or suitable fulminating material 145. Metal members 146 and 147 may be assembled as illustrated in Fig. 7 wherein the strip 147 is separated by means of a suitable strip of insulating material from a strip formed by a plurality of blocks 146 each of which is in turn insulated from the adjacent blocks. Suitable half-bores or grooves are provided in the members 146 and 147 whereby the spring strips 142 and 144 which may be of suitable wire, may slide in these grooves in order that the assembled cap may be inserted in the socket bores jointly formed in the members 146 and 147. In Fig. 7 a plurality of these caps is shown, 153, 158, etc., jacked into the strip assembly described, which is positioned across the record 100. As shown in Fig. 8 the paper 100, in passing between suitable facings 149 attached to the underside of the strip formed of the parts 146 and 147 and to the upper face of a lower strip 148, respectively, is "tracked" by the lower end of the cap shell 140. A hole is provided through the lower strip 148 and its facing 149 to register with the cap socket. Therefore, on the cap being detonated a hole will be burned or blown through the record strip 100, or discoloration to form a suitable marking will result. The facings may be of suitable material to closely contact with the record and thereby prevent ignition of the sheet in case any cap may develop an excessive amount of flame on being detonated. In comparing and determining the burning time of several fuses it is proposed to further improve the accuracy of such plural burnings and to facilitate the matter of comparisons by providing equipment for simultaneously igniting a plurality of fuses, and providing for the individual timing of each fuse with respect to the starting and the ending of its burning. To effect simultaneous ignition of a plurality of fuses an equipment similar to that illustrated in Fig. 3 may be provided for each fuse, and the weight release magnets 74 of the plurality of equipments connected to be controlled by a single circuit as shown in Fig. 9. In this arrangement depression of the key 77 disconnects the source of current 78 from the magnets 74 of the equipments associated with the three fuses A, B, and C to permit the associated weights 76, it being understood that such equipment may also be present for the fuses B and C, to release and simultaneously ignite the fuses. Assuming now that similar firing of the three fuses A, B, and C shown in Fig. 7 has been effected, each of the contacts 80 would have responded to such concussion to momentarily open its respective circuit and the result of such operations will now be described. At the first fuse A separation of the contacts 80 removes a shunt path normally established around the marking cap 153 to permit current from a source 150 to traverse a bus conductor 151 to the strip 147 thence through the filament strip of the cap 153, cap socket block 152, a conductor 155 and a resistance unit 156 to the opposite side of the source 150. This current may either heat or entirely vaporize the filament 143 of the cap and thereby explode the powder 145 to mark the record 100 as described. The current bus 151 as connected energizes one terminal of each of the caps 153, 158, 162, 165, 169, and 171 since these caps are common to the strip 147. Since the contacts 80 associated with the fuse A are connected to join the current bus 151 with the individual conductor 155 of the cap 153 it will be clear that current may not traverse the circuit through the cap until the contacts 80 may be opened, as described. For the fuse B, separation of the associated contacts 80 removes a shunt normally joining the current bus 151 with the individual lead 163 of the cap 162, whereupon current through this cap may complete circuit through the conductor 163 and a resistance unit 164 to the opposite side of the source 150, thus detonating this cap. Operation of the contacts 80 at the fuse C removes a shunt normally present from the bus 151 to a lead 177 individual to the cap 169, and current through this cap by way of its individual conductor and a resistance unit 170 will cause this cap to operate and mark the record. Since the three fuses were simultaneously ignited the operations just described would have taken place at the same instant, therefore the three indications at the point 175 on the record 100 would correspond with the operation of the caps 153, 162, and 169 in indicating the commencement of the respective burning events. As the burning of each fuse is completed its base charge powder will be exploded to destroy the associated foil strip 47, and the effect of such operations will now be considered. Accordingly, at the fuse A a shunt path is normally present from the bus conductor 151 as may be traced by way of the contacting grip 90, the foil strip 47 and the body of the fuse A thence over a conductor 161 to a conductor 159 of the cap 158. Destruction of the foil 47 of this shunt path permits current to traverse the cap 158, the conductor 159, and a resistance unit 160 to a bus conductor 157 energized from the opposite side of the generator 150 with respect to the bus conductor 151. Corresponding shunt paths through grip 90, foil 47, fuse, and respective conductors 168 and 174 at the fuses B and C on being removed by destruction of the strips 47 permit current to traverse the cap 165, conductor 166, and a resistance 167 to the bus 157 in association with the fuse B, while current through the cap 171, conductor 172, and a resistance 173 may act in association with the fuse C. As indicated at the point 176 on the sheet 100 the markings produced by operation of the caps 158, 165, and 171 conform to a simultaneous cessation of burning of the three fuses, it will be clear, however, that in case the burning period of the fuses had varied, one fuse with another, a corresponding variation would have resulted in the chronographic markings. In providing uniformly spaced time markings on the record, for convenience in determining the various burning times in seconds, either the arrangement of the pin 115 as shown in Fig. 6 or the arrangement shown in Fig. 7 may be employed. In the latter arrangement stylus-like members 341 and 342, insulated with respect to each other, are positioned to track the record 100 and periodic applications of current, which may be effected by the clock means (Fig. 6), to these members may cause markings on the record due to chemical effects which may result from the use of a suitably sensitized sheet 100.

Figure 6A:
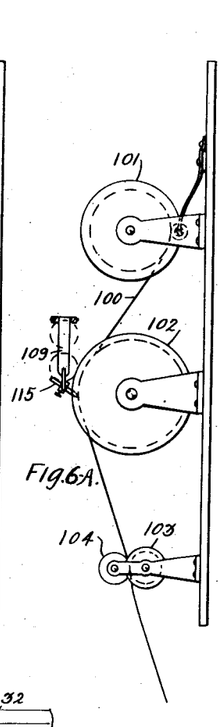
Fig. 6A is a view in side elevation of the chronographic equipment, shown in Fig. 6.

The arrangement shown in Fig. 9 may be considered as an extension of the capacity of the arrangement jointly shown in Figs. 3 and 6, and provides for the simultaneous burning of a plurality of fuses. In this arrangement current bus conductors 179 and 181 of a source 180 respectively connect to the contacts 80 of equipments associated with fuses A, B, and C and to the windings of pen control magnets 182, 185, and 188. The normal energizing circuits for these magnets being further completed over respective conductors 184, 187, and 190 and the corresponding paths through the fuse, foil 47, grip 90, and loose contacts 80. As shown in the drawing, the markings at the point 175 on the strip 100 may be understood to have been made by the pens 183, 186, and 189 at an instant the key 77 may have been depressed to release firing rams 76, thereby momentarily operating the contacts 80 to permit a corresponding momentary release of the pens by the associated magnets, as described in connection with Fig. 3. It may be considered, therefore, that the three fuses are in process of burning on cessation of which the strips 47 will be destroyed to deenergize the magnets and thereby release the pens 183, 186, and 189 to deflect to the right and cause an offset in the respective lines similar to the offset 132 in the line 118 Fig. 24. For time marking effects it may be understood that the pen 115 is under the clock control as shown and already described in connection with Fig. 6.

Figures 10, 11, 12, 13, 14, 15, 16, 17, 18, 19, 20, 21, 22:
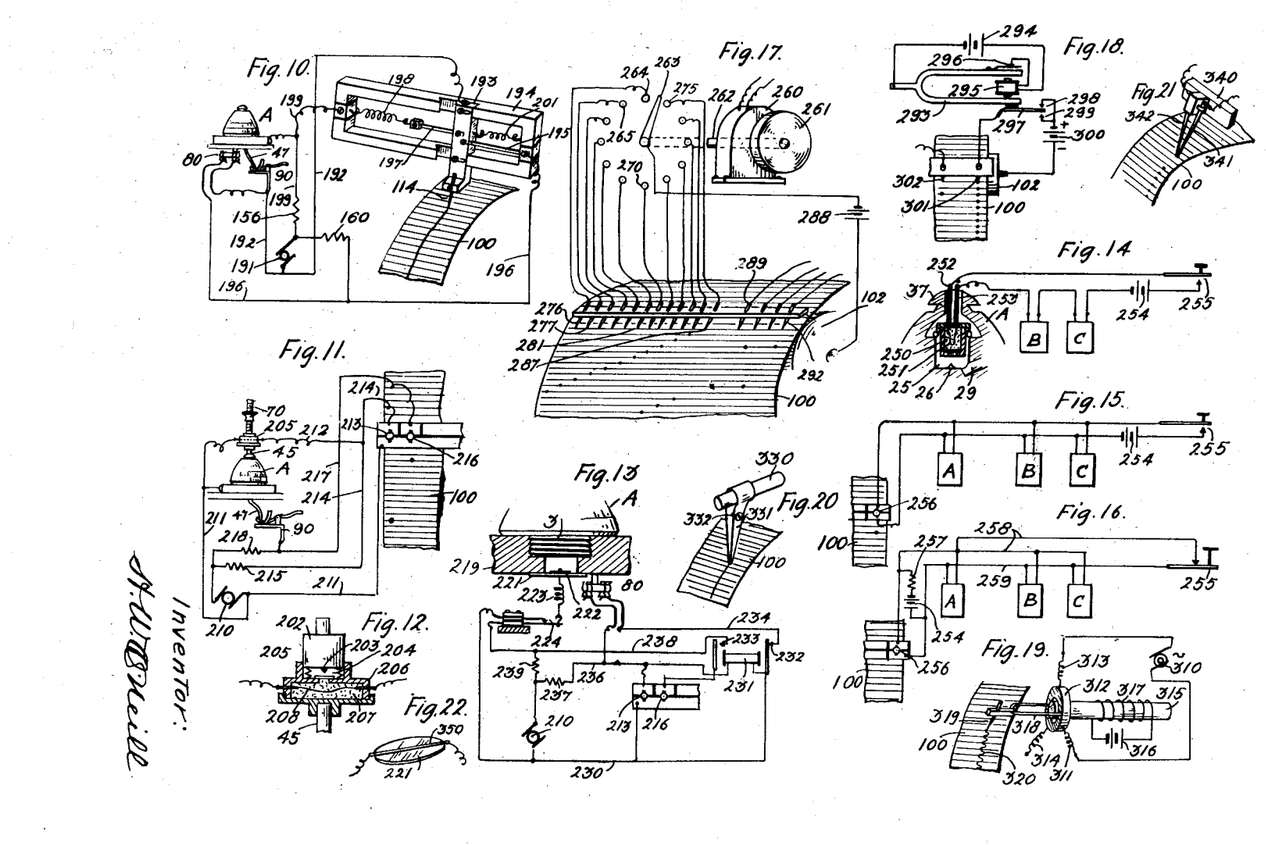

In considering a further alternate arrangement for controlling chronographic markings reference will be had to Fig. 10 of the drawing. In this arrangement a pen carrying member 193 is positioned to be moved transversely in a supporting frame 194. A fusible strip 195 normally retains the member to the right against the tension of a spring 198. In response to concussion in igniting the fuse A the loose contacts 80 interrupt a short circuit normally joining conductors 192 and 196, current from the source 191 may thereupon traverse the conductor 192, the member 193, strip 195 and the conductor 196 thence through a resistance 160 to the source. This current instantaneously melts or vaporizes the strip 195 thereby permitting the spring 198 to overcome the tension of a spring 201 and draw the member 193 to the left. On termination of the fuse burning vaporizing of the strip 47 removes a shunt normally joining conductors 192 and 199 and current may then traverse the conductor 192, member 193, strip 197, spring 198, conductor 199 and a resistance 156 to the source 191. This results in the destruction of the strip 197 to disable the spring 198, and the spring 201 may then draw the member 193 to the right. It will be obvious that during these operations a pen 114 carried by the member 193 will be caused to trace a line on the sheet 100 either at the right or at the left according to the position of the member 193. It will be noted that the points of juncture between the conductor 196 and the strip 195 and the conductor 199 and the spring 198 are insulated from the frame 194. It may also be mentioned that the conductor 199 may be connected directly to the strip 197 to exclude the spring 198 from this circuit, or the spring may be bridged by a suitable conductor in order to protect it from the effect of the relatively strong fusing current.

In describing the alternate arrangement shown in Fig. 11 for controlling the chronographic marking operations corresponding with the ignition of a fuse burning, an assembly 205 the detail of which is shown in Fig. 12, may be inserted between the ram guide rod 70 and the firing plunger 45. The unit 205 comprises a cap or concussion primer arranged to destroy a conducting strip in order to open an electrical circuit. For convenience this unit comprises a plunger 202 having a firing pin 203, and provided with an upper reduced stem which may be inserted in the bore of the guide rod 70 in substitution of the plunger 45. The lower or firing pin end of the plunger 202 extends into a circular opening extending upward from an enclosing casing 206, and seats on a spring 204 which normally holds it in the position shown. Suitable fulminating material 207 is contained in the case and a conducting strip 208 is carried through the chamber in a manner to provide an insulated current path therethrough. A cup-like extension on the lower face of the casing is adapted to receive the end of the firing plunger 45. As shown in Fig. 11 the primer unit is incorporated in an assembly whereby its operation may be conveniently described. Accordingly, on the rod 70 being forced downwardly in response to concussion as described, the plunger 202 will be driven downward to fire the primer 205 on the instant the plunger 45 has forced the concussion plunger 27 of the fuse against its firing pin. Therefore, the fuse will be ignited simultaneously with the exploding of the cap 205 whereby the strip 208 will be destroyed to remove a shunt normally joining a current bus 211 and a conductor 214. This permits current from the bus 211 to traverse the conductor filament of a cap 213 which corresponds with the caps shown and described in connection with Figs. 7 and 8, the conductor 214 and a resistance 215 to the source 210. On cessation of the burning, destruction of the foil strip 47 removes a short-circuit to permit current from the bus 211 to traverse a cap 216, a conductor 217 and a resistance 218 to the opposite side of the source. In a manner similar to that already described operation of the caps 213 and 216 effect markings on the record 100 corresponding with the start and the cessation of the fuse burning.

In describing the alternate arrangement shown in Fig. 13, which may be employed in substitution of the tin foil strip arrangement already described for controlling chronographic markings corresponding with cessation of a fuse burning, the threads 3 of a fuse may be turned into a threaded opening in a block 219 and a small chamber formed by an opening through the bottom of the block may be sealed by a frangible disk 221. A washer 222 serves as a connection for a spring 223 and distributes the strain thereof over a sufficiently extended area of the disk 221 to permit the spring 223 to normally retain a pair of contacts 224 closed. As already described in connection with other figures of the drawing, the contacts 80 respond at the moment a fuse may be ignited to remove a short-circuit thereby permitting a cap 213 to receive current from a source 210 by way of conductors 230 and 236 and a resistance 237. A relay 231 connected in parallel with the cap 213 is provided with normal contacts 232 which are connected in series with the shunting circuit of the contacts 80, therefore, at the instant the contacts 80 interrupt this shunt the cap and the relay receive current at the same instant to explode the cap and to operate the relay, respectively. Operation of the relay closes contacts 233 in preparing a circuit for the operation of the cap 216. This results from explosion of the base charge powder in the fuse, on cessation of burning, whereby the disk 221 may be destroyed or displaced to release the spring 223 in permitting the contacts 224 to separate and remove a short-circuit thereby formed on the cap 216. Current may then flow from the bus 230, through the cap 216, contacts 233 of the relay 231, conductor 238, and a resistance 239 to the source 210. Operation of the caps result in markings as already described. It may be pointed out that the general purpose of the relay 231 is to protect the circuit of the cap 216 at the instant the fuse is fired by concussion action. This is necessary in situations where the shock of concussion may be likely to jar the contacts 224 open, thereby permitting the cap 216 to be prematurely fired. The contacts 232 of the relay serve to disable the circuit of the contacts 80 in order that they may not reestablish the short circuit which would result in deenergizing the relay 231.

In Fig. 14 the arrangement whereby an electrically operated primer or cap may be employed for the ignition of a fuse under test, in substitution of the arrangement shown in Fig. 3, comprises a primer 250 having an igniting filament 251 which assembly may be substituted for the concussion plunger primer 27 (Fig. 1). Suitable leads or conducting pins 252 and 253 may be fixed to extend the filament circuit of the primer through an opening in the fuse cap 37, in which the leads may be suitably bushed to effect their insulation and also to prevent escape of gas during the time the fuse may be burning. This electric primer arrangement may be considered as particularly convenient and effective in the simultaneous igniting of a plurality of fuses. As shown, serially connected fuses A, B, and C, each equipped with an electrical primer, may be operated at the same instant by closure of a key 255 in connecting a source of current 254 to act through this circuit.

In Fig. 15 the arrangement shown in Fig. 14 has been extended to permit the fuse igniting circuit to also operate a record marking cap 256, while the primers of the three fuses are connected in parallel instead of series. It will be obvious that a marking cap, as the cap 256 may be included in the circuit shown in Fig. 14.

The arrangement shown in Fig. 16 is a modification of the arrangement shown in Fig. 14, in that the key 255 normally short-circuits bus conductors 258 and 259 from which the primer circuits of the fuses and cap are connected. Depression of the key permits current to act through the resistance 257 in operating the primer and cap devices.

In describing alternate arrangements relating more particularly to recording predetermined intervals of time on a chronographic sheet attention will first be directed to Fig. 17 of the drawing. In this arrangement a suitable constant speed motor 260 provided with a shaft 262 and a flywheel 261 carried thereby, may serve to uniformly drive a contactor arm 263 in counter clockwise direction over segment or contact points 264 to 275, inclusive. These segments are respectively connected to pen or stylus members 276 to 287, inclusive, which may be understood as insulated one from another and positioned to track the sheet 100. A battery 288 is connected from the drum 102 to the contactor arm 263, therefore, by providing a chemically sensitized sheet 100 each application of current by way of the arm as it passes over the segments will cause a marking at the point of the respective pen. The connective arrangement shown has been chosen as a convenient method of illustrating the principle of operation and the markings on the sheet would be in the form of successive obliquely extending lines, as the arm 263 in passing from the circuit of the last pen 287 next encounters the circuit of the first pen 276. In considering alternate interconnecting arrangements between the segments and the pens let the last six pens 282–287 be disregarded and the leads therefrom transferred to connect in derived relation and in reversed order to the first six segments 270–275; that is, segment 270 would be half-tapped to the present circuit of the pen 281, segment 271 to the pen 280, continuing thus until the last segment 275 is connected to the first pen 276. This arrangement would result in markings progressing in oblique lines and in these lines being in opposite directions, alternately. By providing twelve additional segments respectively positioned between the present twelve segments the feature of the interconnective arrangement just described for six pens may be carried out in connection with the present twelve pens. The advantage of such plurality of markings as compared with markings which it will be obvious may be made with one or two pens, relates to the facility with which a great many different time readings may be had by mere inspection of the sheet. The pens 289—292 may be considered as under the control of fuse burning operations, and by positioning any number of such pens predeterminedly intermediate the twelve timing pens the time markings and the fuse burning markings will be in such proximity one with another that accurate estimates of time comparisons may be made by inspection without resorting to the use of a scale for measuring between markings under consideration. Many other methods of interconnecting between the segments and the pens as may be desired in order to secure certain relations between the time markings on the sheet will, from the foregoing, be obvious.

Another method of chronographic time markings is shown in Fig. 18, and comprises a tuned fork 293 adapted to be kept in motion by means of a magnet 295 which may be intermittently energized by current from a source 294 as controlled through contacts 296 of the fork. In turn, a contact member 297, also vibrated by the fork, may alternately make contact with oppositely positioned members 298 and 299, and thereby apply current from a source 300 to a pen 301. Assuming that the sheet 100 is suitably sensitized, current from the pen in completing circuit to the drum 102 in returning to the source, will result in markings on the sheet 100 in phase with the frequency of the vibrations of the fork 293. The pen 302 may be understood as under the control of fuse burning equipment similar to that already described.

A further alternate arrangement for effecting time marking intervals on the record sheet of a chronograph is illustrated in Fig. 19, and comprises an alternating current source 310 which may be adapted to operate at a speed to produce current at a constant frequency, connected over a spring 311 to one terminal of a solenoidal coil 312 to emerge from the opposite terminal of this coil by way of a spring 313, thence to the source. A third spring 314 serves with the other springs in maintaining the coil 312 suspended symmetrically and free about a core 315 magnetized by current from a source 316 acting through a winding 317. It will be clear that the wave currents passing through the coil 312 will cause this coil to be oscillated or reciprocated with respect to the polarized core 315, and a pen carrying arm 318 suitably attached to the coil will therefore cause a pen 319 to trace a sine wave or sinuous line 320 on the sheet 100. It may be mentioned that an actual working structure having a core one and three-quarter inches in diameter and provided with a suitable return magnetic pole to properly encompass the coil which comprised a winding ratio of approximately 350 ohms of No. 36 single silk covered magnet wire, would readily reproduce a line representing current at a frequency of 133 cycles per second. The density of the polarizing magnetism in this structure was approximately 100,000 lines per square inch, the pen employed was similar to the pen shown in Fig. 20.

In each of the arrangements already described in which physical movement of a pen or marker is required it will be understood, notwithstanding the relatively cumbersome appearance of the devices shown in the drawings, that such pens as well as all of the moving parts serving in their control should be of the lightest structure possible in order that the inertia of such parts may be reduced to a minimum. The pen shown in Fig. 20 is approximately to scale and consists of twin blades formed as a ruling pen 331 in which a screw 332 may serve to adjust the pen blades with respect to each other and also to clamp the pen to a suitable arm 330 which may consist of very light metal tubing. This pen will hold more than sufficient ink for a fuse burning and may be conveniently cleaned and therefore always ready for immediate use.

In Fig. 21 there is shown an alternate arrangement whereby markings may be produced on a sensitized sheet at moments current may be applied to pass from the pen or stylus 341 to the other stylus 342 which are carried by a suitable insulating support 340.

In Fig. 22 is shown an alternate arrangement which may be substituted for the contacts 224 and the spring 223 shown in Fig. 13. The frangible disk 221 may be positioned as shown in the latter figure and a strip of suitable metal foil 350 attached thereto in such a manner that destruction of the disk by the explosion of a base charge will also vaporize or rupture the strip 350 to open a circuit, whereby record marking devices may respond in a manner similar to the several descriptions already given. It will be clear that the foil strip 350 may be arranged in a variety of ways with respect to its relation to the disk 221 as it is only necessary to provide that a circuit be opened by severing, burning, or dislodging this means coincident with the cessation of a fuse burning. The same may also be said with respect to various methods or arrangements for employing the foil strip 47.

In order that practical results may be had in the manufacture and use of time fuses it is further necessary that accurate data be secured particularly with respect to the speed at which a shell may travel, and this also applies to the changes of speed which take place during different periods in the flight of a shell. As well understood, such changes are influenced to a great extent by the curved path or trajectory of a shell, and the graduated rings of a time fuse must be so laid out with regard to their timing scales that the various changes in speed will be automatically compensated for. In Fig. 23 a system is shown whereby such testing of projectiles or shells may be carried out in a manner to secure the exactness of results possible with the fuse testing chronographic system just described. A pen 351 corresponds with a gun 350 and is arranged in such a manner that on a shell 352 being fired from the gun this pen will record or indicate the instant the shell left the gun, while a second pen 353 will respond at an instant the shell arrives at or passes a predetermined point in its flight. For convenience of description the pens are shown as arranged to effect marking of the record 100 through the effect of chemical action which may take place at the instant current is received by the pens. The pen 353 is normally short-circuited by the circuit of a suitable field screen 357, while a link strip 358 near the gun normally short circuits the contacts of the pen 351. As illustrated in the drawing, on the gun being fired the shell immediately ruptures the shunting strip 358, thereby permitting current from a source 354 to traverse a resistance 355, the pen 351, thence to the drum 102 and back to the source. The resulting indication on the record will therefore correspond with the instant the projectile started on its flight. On passing through the screen 357 the shell ruptures this circuit and thereby removes the shunt to permit current from the source to traverse a resistance 356, the pen 353 thence to the drum 102 and back to the battery. The latter pen will therefore mark the record at the instant the shell passed the screen 357. From the foregoing description it will be clear that by employing a plurality of marking devices and respective screens therefor placed at different predetermined distances from the gun, a graphic record may be obtained with respect to the speed characteristics of a shell. It will be understood that a suitable means for marking time intervals on the record 100 will be employed, and also, that such timing arrangement may be either one of the several arrangements described in this system, while the marking arrangement responsive to the shell may also be either one of the corresponding fuse marking arrangements described in connection with this invention.

It may be further noted that the relatively high speed polarized magnetic arrangement shown in Fig. 19 may, if desired, be employed in substitution of the magnets 106 and 109, Fig. 3, and the magnets 106, 182, 185, and 188, Fig. 9, for the purpose of controlling the corresponding pen operations.

Referring now to tests in which the total time of an event is exceedingly small it will be pointed out that for so-called close work in the field shrapnel shells are fired on fuse time settings in which the powder of the time train rings is not included in the fire transmitting path. The fire from the concussion primer is transmitted directly through the various pellets to the base charge powder. Actual experience has demonstrated that a single physically moving marking device is incapable of the necessary double response in case it were attempted to perform a test of this character with a single pen as any one of the pens illustrated in either Figs. 6 or 9. It is however possible to record such tests by the employment of the double marking arrangements shown in Figs. 7, 11, 13, and 23. For these grape or canister tests the equipment may be the same, therefore, as that indicated in the last mentioned figures. As an example, the arrangement shown in Fig. 11 may be employed, and all operations will be carried out in exactly the same manner as that described for a burning test. Before the fuse is placed in the firing fixture it is "set" on "through" or canister and in response to the impact of the weight 76 the concussion plunger is fired, almost immediately following this the flash reaches and explodes the base charge powder, therefore the marking cap 213 will indicate the instant the fuse primer fulminated while the cap 216 will indicate the instant the shell would have exploded. On the record 100 these markings will appear relatively close together, depending, of course, upon the speed at which the sheet or record may be travelling.

It will be understood that various changes may be made in the arrangement and coordination of the devices of this system without departing from the spirit of this invention, and in line with this a few observations will now be made. I have demonstrated that a suitable filament similar to an electric cautery may be positioned in such proximity to a chronographic record that a suitable marking may be produced thereon by the application of current to the filament. It may therefore be understood that in substitution of the fulminating assembly shown in Fig. 8 that the filament 143 may be so positioned with respect to the record 100 that incandescence thereof, as may be controlled by either of the equipments shown in Figs. 7, 10, 11, and 13, may effect a suitable marking thereon. If desired, the arrangement may be such that the filament may be entirely fused or vaporized. It will also be pointed out that by means of a sufficiently exact constant speed device for feeding the record 100 forward the markings corresponding with an event or test may be directly read with respect to time, thereby permitting the equipments for indicating uniform intervals of time to be dispensed with. I have also demonstrated that better results may be had with regard to the quickness of operation of the pen controlling magnets by applying the release of an armature to effect the markings. This requires that during the time the magnet may be in its operated position a considerable air-gap should be present between the armature and the poles of the electromagnet, the armature 110 of the magnet 109 is shown thus in Fig. 6, stop screw 112 is provided for regulating this gap-space while the stop screw 111 limits the release stroke of the armature. It will also be pointed out that although the present system has been described more particularly in connection with the testing of time-fuses, and projectiles that it may, nevertheless, be readily applied to various other uses, and due to the exactness of the time records which may be produced the system is readily applicable to many tests usually considered as only to be handled in connection with the more elaborate and expensive oscillographic processes.

What I claim is:—

1. In a chronograph system, record roll, explosive means positioned for marking said record roll, means for initiating an event, means responsive to the occurrence of said event, and means controlled by said responsive means to operate said explosive means.

2. In a system for recording intervals of time, record roll, a first and a second concussion means, means controlled by said first concussion means to initiate an event, means controlled by said second concussion means to mark said record roll, first explosive means responsive to the termination of said event, electric means controlled by said first explosive means, and second explosive means controlled by said electric means further to mark said record roll.

3. In a chronographic system, record roll, current supply, marking means for effecting graphic indications on said record roll concussion, means to cause the occurrence of an event, fusible circuit means for controlling said marking means, and means controlled by said concussion means to operate said fusible circuit means by applying said current supply thereto.

4. In a chronographic system, record roll, current supply, marking means for effecting graphic indications on said record roll, concussion means to cause an event to occur, first and second fusible sections for controlling said marking means, circuit means responsive to said concussion means to apply said current to operate said first fusible section, and means responsive at the conclusion of said event to render said current effective to operate said second fusible section.

5. In a chronograph system, record roll, a first circuit normally closed and including electroresponsive means for marking said record, a second circuit normally closed for disabling said electroresponsive means, a time fuse and a firing means therefor, and means controlled by said firing means for disabling and opening said second circuit.

6. In a chronograph system, record roll, electroresponsive means and a normally closed circuit therefor, a shunt circuit for normally disabling said electroresponsive means, means for initiating an event, means controlled in the initiation of said event for destroying a portion of said shunt circuit to enable said electroresponsive means, and means controlled by said electroresponsive means for marking said record roll.

7. In a fuse testing system, a ram for igniting a fuse, circuit contacts enclosed in a sealed chamber responsive to concussion of said ram in igniting a fuse, and a circuit section of conducting foil positioned to be destroyed by flame emitted by a fuse under test.

8. In a fuse testing system having an anvil and a fuse holding fixture thereon and concussion means for igniting a fuse which may be seated in said fixture, circuit contacts to separate at a plurality of points arranged to be operated by vibrations transmitted through said anvil by said concussion means, and a circuit section adapted to be vaporized by flame from a fuse which may be under test.

9. In a fuse testing system, an anvil and a fuse holding fixture thereon, a longitudinally movable guide rod to engage the firing pin of a fuse which may be seated in said fixture, an electromagnet and a control circuit therefor, a fuse firing ram to form the armature of said electromagnet arranged to traverse said guide rod, circuit control means responsive to concussion effects produced in said anvil by the impact of said ram in firing a fuse, and a circuit section arranged to be consumed by flame emitted by a fuse under test.

10. In a fuse testing system, a fuse holding fixture formed of a fixed jaw and a movable jaw screw-threaded to engage threads in the base of a time fuse, spring means for retaining said jaws in their closed position in securing a fuse, means for firing a fuse seated in said fixture, first circuit control means enclosed in a sealed chamber responsive to said firing means, and second circuit control means to be destroyed by vapors emitted by a fuse under test.

11. In a chronograph system, record roll, first and second closed circuits including electroresponsive devices for respectively indicating the initiation and progression of an event on said record roll, third and fourth circuits normally closed for respectively disabling the electroresponsive devices of said first and second circuits, means for causing an event to transpire, and means controlled in the initiation and progression of said event for successively disabling said third and fourth circuits in enabling the devices of said first and second circuits to respond.

12. In a chronographic system, record roll, explosive means positioned to mark said record roll, circuit means including a fusible section, and means for melting said fusible section to control the operation of said explosive means.

13. In a chronograph system, record roll, a first and a second explosive cap positioned for further marking said record roll, means to cause an event to transpire, and circuit means controlled in the transpiring of an event for successively operating said first and second explosive caps.

14. In a system for indicating intervals of time, normally closed contacts controlled by vibration, electroresponsive indicating means controlled by said contacts and normally disabled thereby, and means for imparting vibratory motion to said contacts to actuate said indicating means.

15. In a system for indicating intervals of time, first and second electroresponsive indicating means, vibratory contacts sealed within a chamber for controlling said first indicating means, a conducting foil for controlling said second indicating means, and means for vaporizing said foil.

16. In a fuse testing system, a first and a second indicator formed of electroresponsive detonators, firing means for igniting a fuse, vibratory contacts responsive to said firing means for operating the first indicator, and circuit means affected in the burning of a fuse for operating the second indicator.

17. In a system for testing time fuses, electroresponsive means for firing a fuse, a sealed assembly formed of a plurality of contacts normally closed by an inertia member, an anvil for seating a fuse under test and subject to high frequency vibrations on the firing of a fuse, record roll, electroresponsive marking means for said record roll, and means to transmit said vibrations to said inertia member for maintaining the contacts of said sealed assembly open during the period of the vibrations in controlling the operation of said electroresponsive marking means.

18. In a fuse testing system, an electroresponsive chronograph, means for burning a fuse, and a circuit section destroyed by flame emitted by a fuse at the instant of cessation of its burning to control said chronograph.

19. In a chronograph system, record roll, explosive means positioned to mark said record roll, circuit means including vibratory means for controlling said explosive means, and means to create vibrations to actuate said vibratory means in operating said explosive means.

20. In a chronograph system, record roll, electroresponsive means to mark said record roll, means for creating vibrations in initiating an event, a circuit including a fusible section for said electroresponsive means, a source of current, and vibratory means responsive to said vibrations to enable current from said source to operate said fusible section in controlling said electroresponsive means.

21. In an electroresponsive chronograph system, means for testing time fuses, means for creating vibrations in igniting a fuse, means for controlling flame at the conclusion of the burning of a fuse, circuit means including vibratory means accelerated by said vibrations for affecting said chronograph system, and circuit means including a fusible section destroyed by said flame in further affecting said chronograph system.

22. In a chronograph system, record roll, electroresponsive means to mark said record roll, a vibratory member sealed to form a plurality of contacts, and means to create vibrations to accelerate said vibratory member in controlling said electroresponsive means.

23. In a chronograph system, means for creating vibrations in initiating an event, a first and a second circuit each including a source of current and a fusible section, vibratory means responsive to said vibrations to enable current from said source to operate the fusible section of said first circuit in affecting said chronograph, and means responsive at the conclusion of an event to render the current effective to operate the fusible section of the second circuit in further affecting said chronograph.

In witness whereof, I hereunto subscribe my name this 24th day of Sept., A. D. 1918.

HENRY W. O'NEILL.